United States Patent
Schulzgen et al.

(10) Patent No.: US 8,077,747 B2
(45) Date of Patent: Dec. 13, 2011

(54) PHOSPHATE GLASS BASED OPTICAL DEVICE AND METHOD

(75) Inventors: Axel Schulzgen, Tucson, AZ (US); Jacques Albert, Gatineau (CA); Nasser Peyghambarian, Tucson, AZ (US); Seppo Honkanen, Tucson, AZ (US); Li Li, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 200 days.

(21) Appl. No.: 11/861,923

(22) Filed: Sep. 26, 2007

(65) Prior Publication Data
US 2008/0130692 A1 Jun. 5, 2008

Related U.S. Application Data

(60) Provisional application No. 60/847,582, filed on Sep. 27, 2006.

(51) Int. Cl.
*H01S 3/30* (2006.01)

(52) U.S. Cl. ............ 372/6; 372/50.11; 372/96; 385/123

(58) Field of Classification Search ................. 372/6
See application file for complete search history.

(56) References Cited

U.S. PATENT DOCUMENTS

| | | | |
|---|---|---|---|
| 5,367,588 A * | 11/1994 | Hill et al. | 430/5 |
| 5,844,927 A * | 12/1998 | Kringlebotn | 372/6 |
| 6,298,184 B1 * | 10/2001 | Putnam et al. | 385/37 |
| 6,816,514 B2 * | 11/2004 | Jiang et al. | 372/6 |

OTHER PUBLICATIONS

G. A. Ball, et al., "Continuously Tunable Single-Mode Erbium Fiber Laser", Optics Letters, vol. 17, No. 6, Mar. 15, 1992, pp. 420-422.
J. L. Zyskind, et al., "Short Single Frequency Erbium-Doped Fibre Laser", Electronics Letters, vol. 28, No. 15, Jul. 16, 1992, pp. 1385-1387.
P. Laporta, et al., "Erbium-Ytterbium Microlasers: Optical Properties and Lasing Characteristics", Optical Materials 11 (1999), Jan. 1999, pp. 269-288.
L. Dong, et al., Efficient Single-Frequency Fiber Lasers With Novel Photosensitive ER/YB Optical Fibers, Optics Letters, vol. 22, No. 10, May 15, 1997, pp. 694-696.
W. H. Loh, et al., "High Performance Single Frequency Fiber Grating-Based Erbium: Ytterbium-Codoped Fiber Lasers", Journal of Lightwave Technology. vol. 16, No. 1, Jan. 1998, pp. 114-118.
Christine Spiegelberg, et al., Low-Noise Narrow-Linewidth Fiber Laser At 1550 NM (Jun. 2003), Journal of Lightwave Technology, vol. 22, No. 1, Jan. 2004, pp. 57-62.
T. Qiu, "Generation of Watt-Level Single-Longitudinal-Mode Output From Cladding-Pumped Short Fiber Lasers", Optics Letters, vol. 30, No. 20, Oct. 15, 2005, pp. 2748-2750.
A. Schülzgen, et al., "Single-Frequency Fiber Oscillator With Watt-Level Output Power Using Photonic Crystal Phosphate Glass Fiber", Optics Express, vol. 14, No. 16, Aug. 7, 2006, pp. 7087-7092.

(Continued)

*Primary Examiner* — Jessica Stultz
*Assistant Examiner* — Xnning Niu
(74) *Attorney, Agent, or Firm* — Oblon, Spivak, McClelland, Maier & Neustadt, L.L.P.

(57) ABSTRACT

An optical device includes an optical fiber having a core including multicomponent phosphate glasses, and a cladding surrounding the core, and a first fiber Bragg grating formed in a first portion of the core of the optical fiber and having an index modulation amplitude greater than $2 \times 10^{-5}$.

13 Claims, 15 Drawing Sheets

OTHER PUBLICATIONS

S. Taccheo, et al., "Transient Insensitive All-Fibre Gain-Clamped EDFA Based on Highly-Doped ER: Yb-Fibre", Electronics Letters, vol. 42, No. 10, May 11, 2006, 2 pages.

G. J. Spühler, et al., "Soliton Mode-Locked ER:Yb:Glass Laser", Optics Letters, vol. 30, No. 3, Feb. 1, 2005, pp. 263-265.

Stavros Pissadakis, et al, "Photosensitivity of Ion-Exchanged ER-Doped Phosphate Glass Using 248nm Excimer Laser Radiation", Optics Express, vol. 12, No. 14, Jul. 12, 2004, pp. 3131-3136.

L. Li, et al., "Ultracompact Cladding-Pumped 35-mm-Short Fiber Laser With 4.7-W Single-Mode Output Power", Applied Physics Letters 88, (2006), 161106-1-161106-2.

P.J. Lemaire, et al., "High Pressure $H_2$ Loading As a Technique for Achieving Ultrahigh UV Photosensitivity and Thermal Sensitivity in $GeO_2$ Doped Optical Fibers", Electronics Letters, vol. 29, No. 13, Jun. 24, 1993, pp. 1191-1193.

Sriraman Kannan, et al., "Thermal Stability Analysis of UV-Induced Fiber Bragg Gratings", Journal of Lightwave Technology, vol. 15, No. 8, Aug. 1997, pp. 1478-1483.

J. Albert et al., "UV-Written Bragg Gratings in Silver Ion-Exchanged Phosphate Glass Channel Waveguides", Proceedings of the 2005 Topical Meeting on Bragg Gratings, Photosensitivity and Poling, Sydney, Australia, 2005, pp. 402-404.

Oleg M. Efimov, et al., "High-Efficiency Bragg Gratings in Photothermorefractive Glass". Applied Optics, vol. 38, No. 4, Feb. 1, 1999, pp. 619-627.

P. Laporta, et al., "Erbium-Ytterbium Microlasers: Optical Properties and Lasing Characteristics", Optical Materials, Jan. 1999, pp. 269-288.

Stavros Pissadakis et al., "Photosensitivity of Ion-Exchanged ER-Doped Phosphate Glass Using 248nm Excimer Laser Radiation", Jul. 12, 2004, vol. 12. No. 14, Optics Express, pp. 3131-3136.

J. Albert, et al., "Strong Bragg gratings in phosphate glass single mode fiber," published Sep. 8, 2006, Applied Physics Letter, American Institute of Physics, vol. 89, 101127 (2006), pp. 101127-1-101127-3.

Nemanja Jovanovic, et al., "Stable high-power continuous-wave $Yb^{3+}$-doped silica fiber laser utilizing a point-by-point inscribed fiber Bragg grating," published May 4, 2007, Optics Letters, Optical Society of America, vol. 32, No. 11, Jun. 1, 2007, pp. 1486-1488.

* cited by examiner

PHOSPHATE GLASS BASED OPTICAL DEVICE AND METHOD

CROSS-REFERENCE TO RELATED APPLICATIONS

This invention claims priority from U.S. Provisional Application No. 60/847,582, filed Sep. 27, 2006, the contents of which are incorporated herein by reference.

STATEMENT REGARDING FEDERALLY SPONSORED RESEARCH OR DEVELOPMENT

This invention was made with government support under contract F49620-02-1-0380 awarded by USAF/AFOSR. The government has certain rights in the invention.

BACKGROUND OF THE INVENTION

Field of the Invention

The present invention relates to a multicomponent phosphate glass based optical device and a method of producing the optical device.

The present invention includes the use of various technologies referenced and described in references identified in the following LIST OF REFERENCES by the author(s) and year of publication. The contents of these documents are incorporated in their entirety herein by reference.

LIST OF REFERENCES

[1] G. A. Ball and W. W. Morey, Opt. Lett. 17, 420 (1992).
[2] J. L. Zyskind, V. Mizrahi, D. J. DiGiovanni, and J. W. Sulhoff, Electron. Lett. 28, 1385 (1992).
[3] P. Laporta, S. Taccheo, S. Longhi, O. Svelto, and C. Svelto, Opt. Materials 11, 269 (1999).
[4] L. Dong, W. H. Loh, J. E. Caplen, J. D. Minelly, K. Hsu, and L. Reekie, Opt. Lett. 22, 694 (1997).
[5] W. H. Loh, B. N. Samson, L. Dong, G. J. Cowle, and K. Hsu, J. Lightwave Tech. 16, 114 (1998).
[6] Ch. Spiegelberg, J. Geng, Y. Hu, Y. Kaneda, S. Jiang, and N. Peyghambarian, J. Lightwave Tech. 22, 57 (2004).
[7] T. Qiu, S. Suzuki, A. Schülzgen, L. Li, A. Polynkin, V. Temyanko, J. V. Moloney, and N. Peyghambarian, Opt. Lett. 30, 2748 (2005).
[8] A. Schülzgen, L. Li, V. L. Temyanko, S. Suzuki, J. V. Moloney, and N. Peyghambarian, Optics Express 14, 7087 (2006).
[9] S. Taccheo, G. Della Valle, K. Ennser, G. Sorbello and S. Jiang, Electron. Lett. 42 594 (2006).
[10] J. Albert, A. Schülzgen, V. L. Temyanko, S. Honkanen, and N. Peyghambarian, Appl. Phys. Lett. 89, 101127 (2006).
[11] G. J. Spühler, L. Krainer, E. Innerhofer, R. Paschotta, K. J. Weingarten, and U. Keller, Opt. Lett. 30, 263-265 (2005).
[12] S. Pissadakis, A. Ikiades, P. Hua, A. K. Sheridan and J. S. Wilkinson, Opt. Express 12, 3131 (2004).
[13] L. Li, A. Schülzgen, V. L. Temyanko, M. M. Morrell, S. Sabet, H. Li, J. V. Moloney, N. Peyghambarian, Appl. Phys. Lett. 88, 161106 (2006).
[14] A. Othonos and K. Kalli, *Fiber Bragg gratings: fundamentals and applications in telecommunications and sensing*, Artech House, Boston (1999).
[15] P. J. Lemaire, R. M. Atkins, V. Mizrahi and W. A. Reed, Electron. Lett. 29, 1191 (1993).
[16] S. Kannan, J. Z. Y. Guo, and P. J. Lemaire, J. Lightwave Technol. 15, 1478 (1997).
[17] J. Albert, S. Yliniemi, S. Honkanen, A. Andreyuk, and A. Steele, in *Proceedings of the* 2005 *Topical Meeting on Bragg Gratings, Photosensitivity and Poling*, B. Eggleton, ed., Sydney, Australia, pp. 402-404 (2005).
[18] O. M. Efimov, L. B. Glebov, L. N. Glebova, K. C. Richardson, and V. I. Smimov, Appl. Opt. 38, 619 (1999).

DISCUSSION OF THE BACKGROUND

Since the demonstration of the holographic side writing technique for fabricating gratings in silica based optical fibers, there has been sustained interest toward the development of high-performance single frequency fiber grating-based rare earth-doped fiber lasers and other optical devices based on gratings formed in a fiber. The potential attraction of such optical devices is the simplicity of the fabrication, involving just the ultraviolet (UV) writing of grating(s) into a silica based fiber. In addition, the wavelength sensitivity to temperature is dictated by the sensitivity of the grating, which is over an order of magnitude lower than that for semiconductor lasers.

In the following, the problems facing the lasers that use a grating are discussed. However, other optical devices (for example a wave filter) that use the same grating are faced with similar problems. For a laser, to ensure robust single frequency operation without mode-hopping, these silica based lasers need to be short, a few cm in length at most. While the earlier grating-based silica fiber lasers relied on the availability of conventional erbium-doped germanosilicate fibers, the laser efficiencies and output powers were however low, typically 0.1% and in the mW regime respectively. These problems facing the silica based lasers are a direct consequence of the low pump absorption due to the short fiber cavity length. Increasing the erbium dopant concentration as a way of increasing the pump absorption is however problematical because germanosilicate fibers, while having the merit of being photosensitive, are particularly prone to ion clustering, which not only leads to a degradation in efficiency but gives rise to instabilities in the laser as well. Thus, while the conventional lasers showed good characteristics in many respects, the need for amplification in order to boost the low laser powers to useful levels of a mW or more is a drawback that prevents the existing silica based lasers from achieving a high performance low noise source.

In the past few years, considerable effort has been put into investigating possible solutions for increasing the operating power of short cavity fiber lasers. While the pump absorption can be increased by over an order of magnitude simply by pumping at an appropriately shorter wavelength, this is unlikely to be a fully practical solution until the arrival of reliable green laser diodes. On the other hand, Er3+:Yb3+ codoped fibers are an immediate possibility. In this scheme, a 980 nm pumped light is mainly absorbed by the Yb3+ ions and then transferred to the Er3+. In addition to the large 980 nm absorption cross-section of Yb3+ (by an order of magnitude greater than that of Er3+), a higher Yb3+ ion concentration is also attainable without detrimental side-effects. The 980 nm pump absorption can therefore be typically increased by up to two orders of magnitude with this approach, with a corresponding increase in laser efficiency and output power.

However, two problems remain for obtaining a practical single frequency Er:Yb grating-based fiber laser. One is the lack of photosensitivity in the phosphosilica and phosphate glass based fibers, the glass hosts that enable large Er:Yb doping levels and efficient Yb3+ to Er3+ energy transfer.

While tin-codoping can provide some enhancement in photosensitivity, the UV exposure time required to reach a suitable grating strength is still very long. Reasonable writing times can be achieved with the incorporation of hydrogen loading, but substantial losses are incurred at the shorter (pump) wavelengths and lead to a loss in device efficiency. In addition, such lasers were observed to operate in both orthogonally polarized modes, which is unattractive for many telecommunications applications.

Another approach could surmount these problems. By adopting an Er3+:Yb3+ fiber with a photosensitive annular region surrounding the phosphosilicate core, strong gratings could be written with relative ease in spite of the non-photosensitive core, enabling efficient lasers to be realized (see for example L. Dong, W. H. Loh, J. E. Caplen, J. D. Minelly, K. Hsu, and L. Reekie, "Efficient single-frequency fiber lasers with novel photosensitive Er/Yb optical fibers," *Opt. Lett.*, vol. 22, pp. 694-696, 1997, the contents of which are entirely incorporated herein by reference).

In addition, the resulting silica based fiber lasers were observed to lase only in a single polarization state and slope efficiencies of 25% were reported. However, the known lasers have a low power output, on the order of a few mW, which makes these lasers unsuitable for the needs of CATV for example, which would require more than a few mW of output power.

Another route to increase the power output of silica based lasers is the fabrication of hybrid phosphate/silicate fiber devices. In these conventional hybrid devices, as shown in FIG. 1, the active fiber is made from highly doped phosphate glass 10 while the fiber gratings 20 are written into a photosensitive silicate fiber section 30 that is fusion spliced to the phosphate fibers, such that a splice interface 40 is formed. In these spliced devices, both optical losses and mechanical instabilities at the splicing points present inherent challenges due to large differences in thermal properties, such as melting temperature and thermal expansion coefficient, between the different glasses. In addition this method is only suitable to make short cavities with Bragg reflectors, while more robust and better tunable distributed feedback (DFB) fiber laser schemes can not be implemented.

SUMMARY OF THE INVENTION

According to one aspect of the present invention, there is provided an optical device including an optical fiber having a core including multicomponent phosphate glasses, and a cladding surrounding the core, and a first fiber Bragg grating formed in the first portion of the core of the optical fiber and having an index modulation amplitude greater than $2 \times 10^{-5}$.

According to another aspect of the present invention, there is provided a method of modulating an index of refraction in an optical fiber that includes, providing the optical fiber having a core including multicomponent phosphate glasses, irradiating a first portion of the core of the optical fiber via a phase mask with laser pulses in the ultraviolet range to form a fiber Bragg grating within the first portion of the core, and heating the irradiated core to increase an index modulation amplitude within the core to above $2 \times 10^{-5}$.

According to still another aspect of the present invention, there is provided a method for generating a laser signal in a laser device having an optical fiber having a core that includes multicomponent phosphate glasses, the core having first and second portions surrounded by a cladding, and at least two fiber Bragg gratings in which an index modulation amplitude is greater than $2 \times 10^{-5}$, the at least two fiber Bragg gratings disposed in the first portion of the core at a predefined distance from each other, the method including pumping from a multimode pump a multimode wave into the cladding corresponding to the second portion of the core, transmitting the pumped multimode wave from the cladding to the at least two fiber Bragg gratings, generating the laser signal between the at least two fiber Bragg gratings based on the pumped multimode wave, and outputting the generated laser signal through one of the at least two fiber Bragg gratings.

According to another aspect of the invention, there is provided a laser device including an optical fiber having a core including multicomponent phosphate glasses, and a cladding surrounding the core, first and second fiber Bragg gratings formed in a first portion of the core of the optical fiber and having an index modulation amplitude greater than $2 \times 10^{-5}$, and an optical cavity between the first and second fiber Bragg gratings and configured to amplify an electromagnetic wave reflected by the first and second fiber Bragg gratings to output a laser signal.

According to another aspect of the invention, there is provided an optical filter including an optical fiber having a core including multicomponent phosphate glasses, and a cladding surrounding the core, and a first fiber Bragg grating formed in a first portion of the core of the optical fiber and having an index modulation amplitude greater than $2 \times 10^{-5}$. An input signal provided in the optical fiber is partially reflected and partially transmitted by the first fiber Bragg grating.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

A novel spliceless optical device that is capable of both (i) outputting a light signal having a high power output (in the orders of tens to hundreds of mW), and (ii) exhibiting photosensitive properties is discussed next.

Most glasses that are used in optical devices (fibers, lasers, etc.) that have a high solubility for erbium and ytterbium, such as phosphate and phosphosilicate glasses, also show a lack of photosensitivity that is necessary for fabrication of efficient fiber gratings. For laser emission to occur, the active medium is placed inside a resonant cavity. An optical feedback can be provided by the reflectivity of the end facets, by mirrors, by distributed feedback (DFB) Bragg gratings that act as mirrors, or by distributed Bragg reflectors (DBR), or by constructing a ring cavity structure. The laser emission occurs when the total gain overcomes the losses in the cavity. Hence, a minimum gain has to be achieved to reach the laser threshold condition.

As discussed above, conventional phosphate based lasers do not have good photosensitive properties and thus, good quality DFB or DBR cannot be made in this type of glasses.

Robust single mode (single wavelength) performance can be achieved using a very short cavity of less than about 5 cm together with a wavelength selective reflector. The output power is dictated by the total absorbed pump power, which is generally proportional to the number of active ions and therefore, proportional to the doping level, to the length of the doped fiber inside the cavity as well as to the crossectional area of the active material that is contained in the core of the doped fiber inside the fiber laser cavity. While longer cavities lead to more stringent requirements on the longitudinal mode selector, a larger crossectional area typically sacrifices single transverse mode operation of the laser.

Thus, output power must typically be traded off against single frequency and single-mode performance in conventional devices. The spectral linewidth of single frequency lasers, defined as the wavelength interval over which the magnitude of all spectral components is equal to or greater than a specified fraction of the magnitude of the component having the maximum value, is in general determined by a variety of noise contributions from the pump laser, the active medium itself, or the laser cavity.

Figure 1:
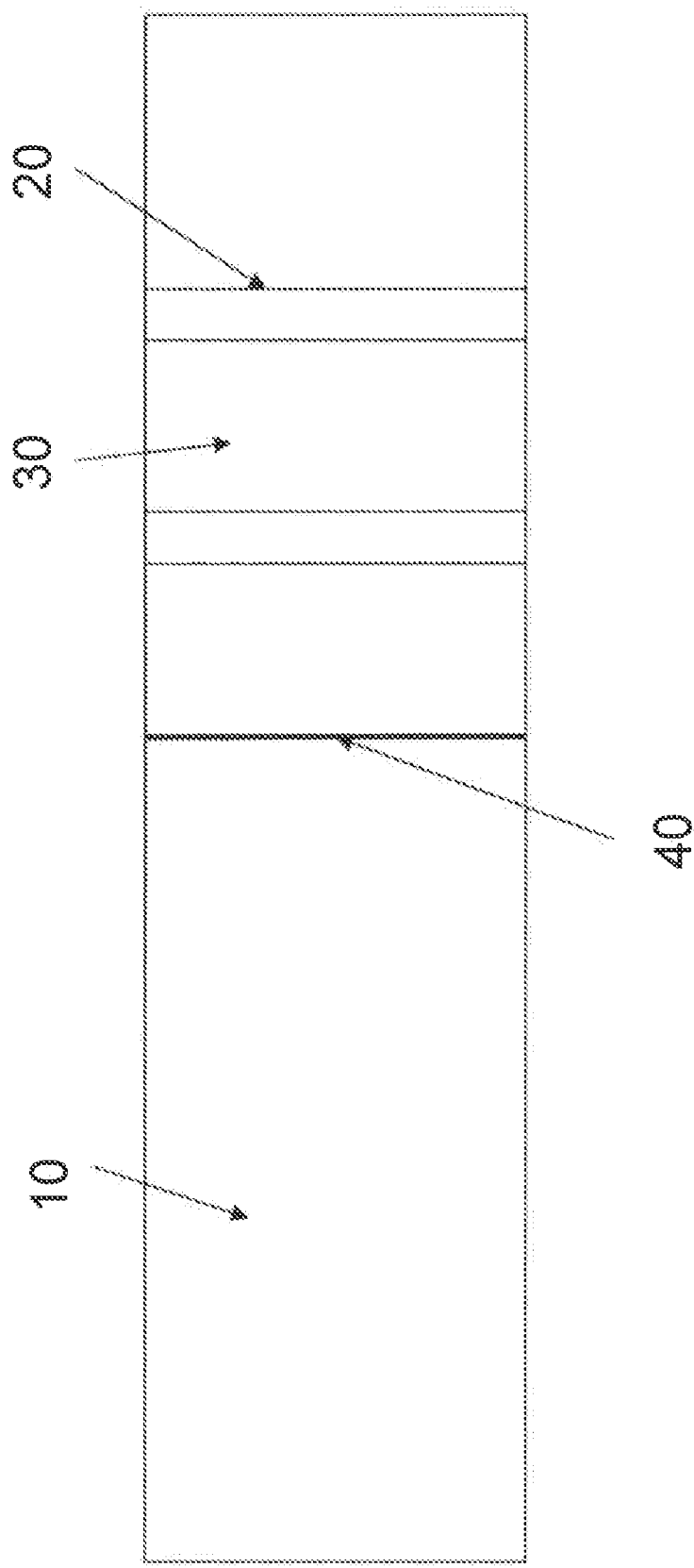
FIG. 1 is a schematic diagram of a hybrid phosphate/silicate fiber device.
Figure 2:
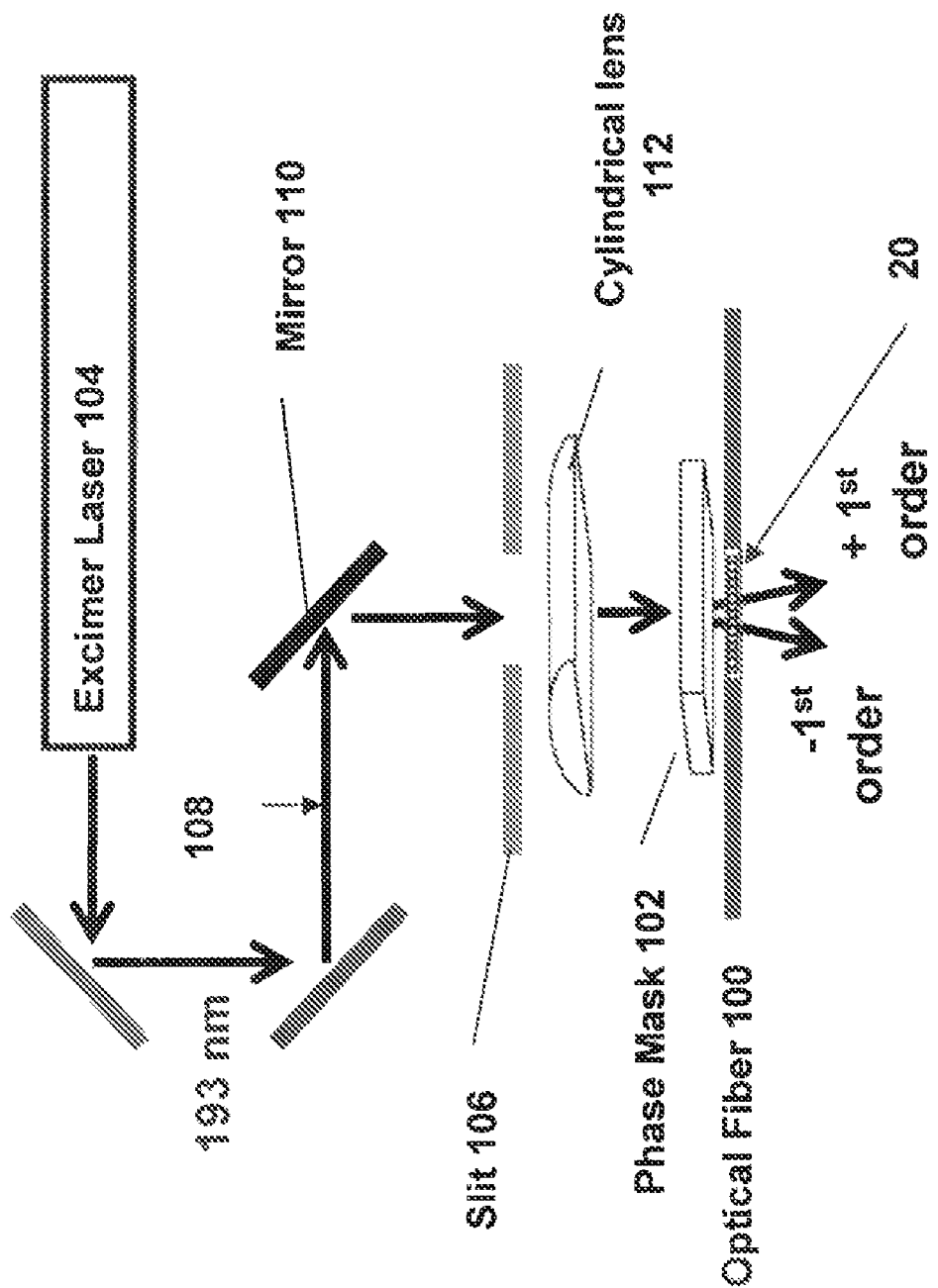
FIG. 2 is a schematic diagram of an arrangement for making a phosphate fiber according to one embodiment of the present invention.

According to one embodiment of the present invention, fiber Bragg gratings (FBGs) are formed in a multicomponent phosphate glass fiber as explained next. FIG. 2 shows the phosphate glass fiber 100 being placed under a phase mask 102. In one embodiment, preforms were drawn into single mode fibers with core diameters of 13.5 microns, outer diameters of 125 microns and a numerical aperture of 0.08. Preforms and fibers were made from multicomponent phosphate glasses that in addition to its main constituent phosphate ($P_2O_5$) also may contain various amounts of at least one of BaO, $Al_2O_3$, and $B_2O_3$. In one embodiment, the BaO, $Al_2O_3$, and $B_2O_3$ materials are not included into the phosphate glass fiber. In another embodiment, fiber Bragg gratings were written in phosphate glass fiber without active ions in the core. In another embodiment, fiber Bragg gratings were written in phosphate glass fiber with 1 wt % $Er_2O_3$ and 8 wt % $Yb_2O_3$ added to the core glass.

Figure 8A:
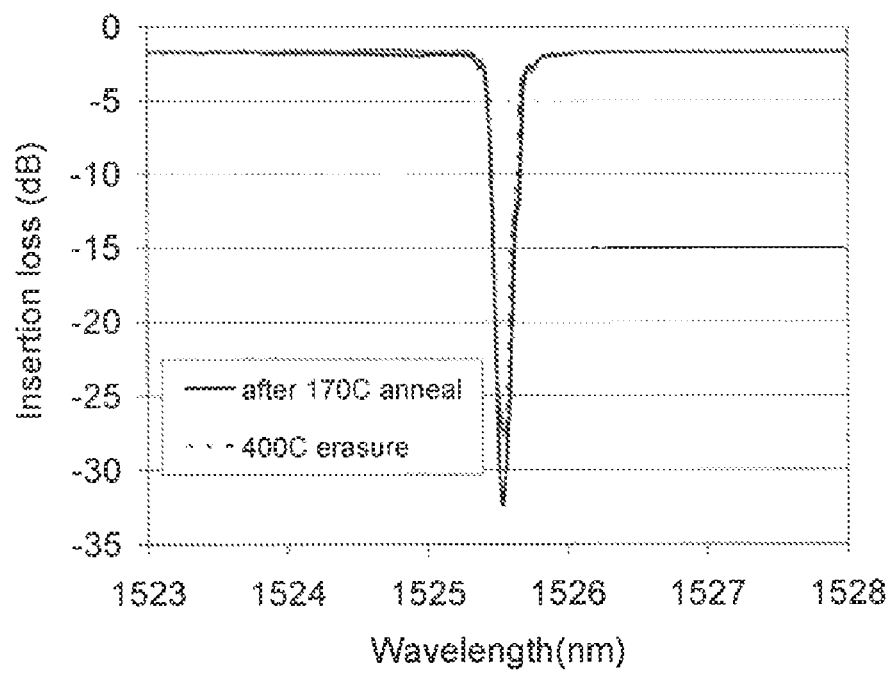
FIGS. 8(*a*) and (*b*) are graphs showing phosphate fiber Bragg grating transmission indicating high reflectivity and a partial decrease in reflectivity of the grating due to exposure to high temperature and also a reflection spectrum of the grating after thermal treatment according to one embodiment of the present invention.
Figure 8B:
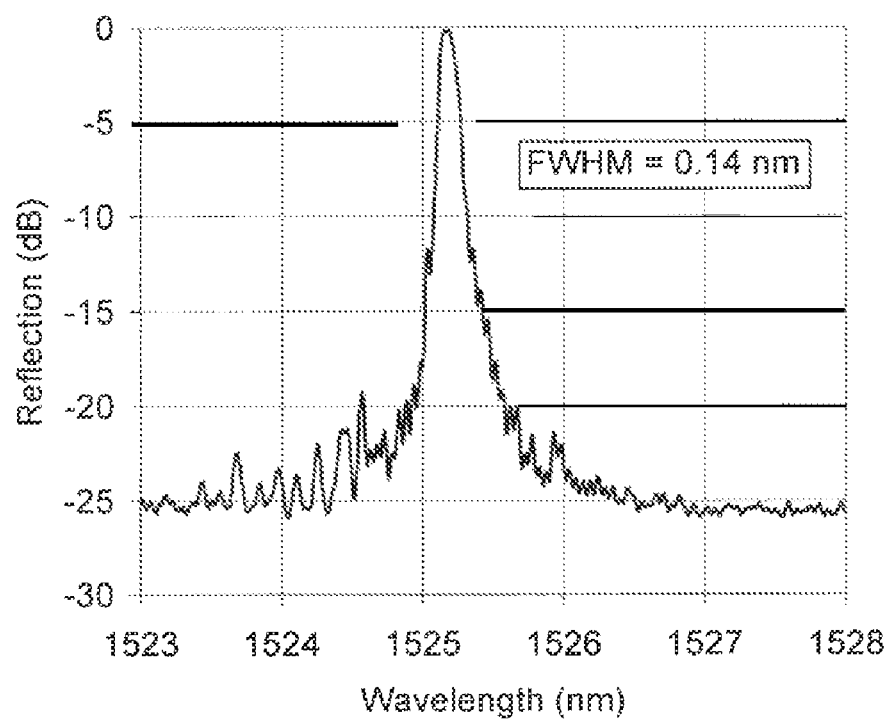

The FBG 20 was formed by irradiating the fiber 100 with 193 nm-wavelength, high intensity pulses from an ArF excimer laser 104 through the phase mask 102. A wave having a wavelength between 190 and 196 nm is also possible. As shown in FIG. 8, fiber Bragg gratings with more than 99% reflectivity and stable at high temperatures were obtained after following the described UV exposure with a thermal treatment process. As discussed in more detail later, the reflectivity grows when the gratings are exposed to an increased temperature. A small thermal decay occurs when exposing the grating to 400° C. for one minute and the reflectivity decreases from 99.9% to 99.7%. The FBG 20 may be formed in one embodiment in an active fiber to make a monolithic fiber laser that does not require any fiber fusion splicing.

In one embodiment, an optical filter includes an optical fiber having a core including multicomponent phosphate glasses, and a cladding surrounding the core, and a first fiber Bragg grating formed in a first portion of the core of the optical fiber and having an index modulation amplitude greater than $2 \times 10^{-5}$. An input signal provided in the optical fiber is partially reflected and partially transmitted by the first fiber Bragg grating. The grating shown in FIG. 2 constitutes an example of such optical fiber.

In one embodiment, short lengths (3-10 cm) of the multicomponent phosphate fibers were spliced to standard telecommunications fiber pigtails (Corning SMF-28) and positioned immediately behind the silica phase mask used to define the grating pattern. The mask 102 had a period of 976.3 nm, corresponding to a fringe pattern period of 488.15 nm in the fiber. In another embodiment, the diffraction efficiency of the mask was controlled by modifying the depth of the grooves of the phase mask, thus controlling the fringe contrast and the amount of zero order light that reached the fiber without diffraction. The improved diffraction efficiency has been achieved by modifying the depth of the grooves in the phase mask. A GSI Lumonics PM-848 laser equipped with an unstable resonator cavity and filled with an ArF mixture to generate the 193 nm wave was used for the excimer laser 104. However, other lasers with similar characteristics are also possible.

The laser was generating, in one embodiment of the invention, 80 mJ pulses at 100 Hz, and the pulses had durations of approximately 14 ns. However, these numbers are exemplary and values of 60 to 100 mJ, 80 to 120 Hz, and 10 to 18 ns for the energy of the pulse, its frequency and time duration, respectively, are also possible. The UV irradiation of the optical fiber via the mask is performed between 10 to 700 seconds. The FBG are formed by interference between the first orders diffraction beams.

After the UV illumination, the fibers are heated (in an oven for example) for 0.5 hours to 10,000 hours. During the heating treatment, an index modulation amplitude becomes greater than $2 \times 10^{-5}$. It was observed that the index modulation amplitude can be even greater than $10^{-4}$. Also, the method described above is independent of a specific material composition of the optical fiber and is different from conventional methods in which, similar to a photographic recording process, chemical reactions are involved. The thermal treatment process may use a temperature between 100° C. and 400° C.

In one embodiment of the invention, an aperture 106 was used to select the most homogeneous part of the excimer laser beam pattern 108, which was then expanded and imaged onto the fiber over a length (L) of 14 mm and a fluence per pulse of 400 mJ/cm². Optionally, a mirror 110 and lenses (for example cylindrical lens 112) can be used to direct the laser beam 108. The reflectivity (R) of the grating was monitored in situ during the irradiation by launching a broadband light from a pumped Er-doped fiber Amplified Spontaneous Emission source (not shown) and measuring the reflected or transmitted light spectra with an Optical Spectrum Analyzer (ANDO AQ6317B) (not shown).

Following the irradiation with UV, the fiber gratings were placed in a temperature controlled oven and re-measured at regular intervals over 1000 hours. The fibers were removed from the oven and allowed to cool to room temperature for each measurement.

Figure 3B:
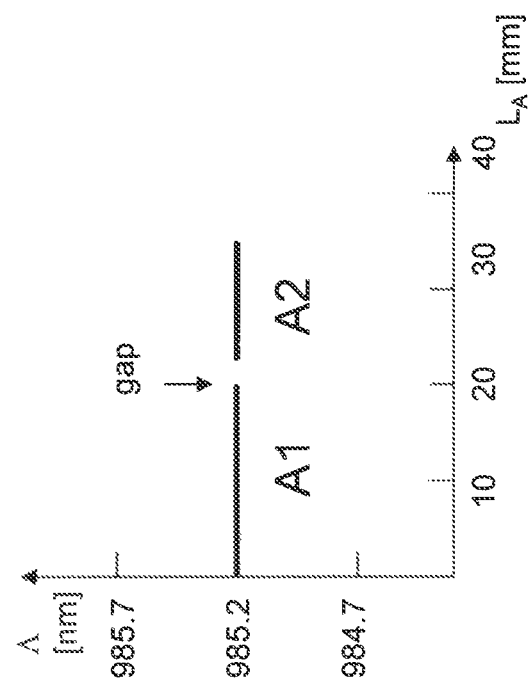
FIGS. 3(*a*) and 3(*b*) are schematic diagrams of a phase mask according to one embodiment of the present invention.
Figure 3A:
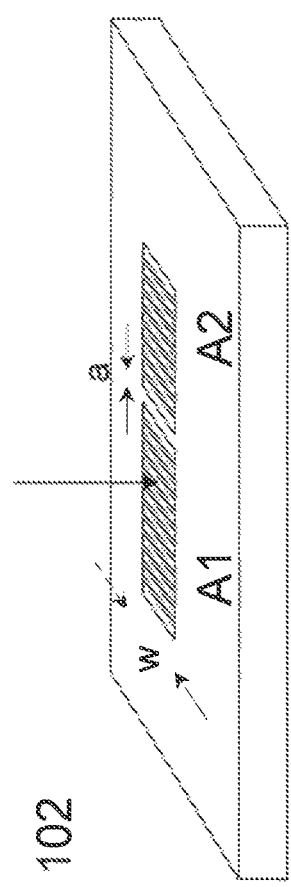
Figure 4B:
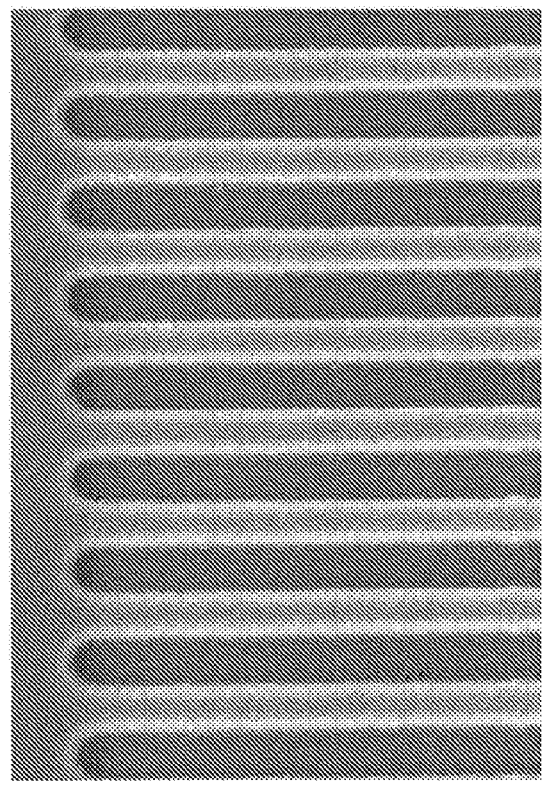
FIGS. 4(*a*)-(*f*) show SEM and AFM images of the phase mask and a section analysis of the phase mask according to one embodiment of the present invention.
Figure 4A:
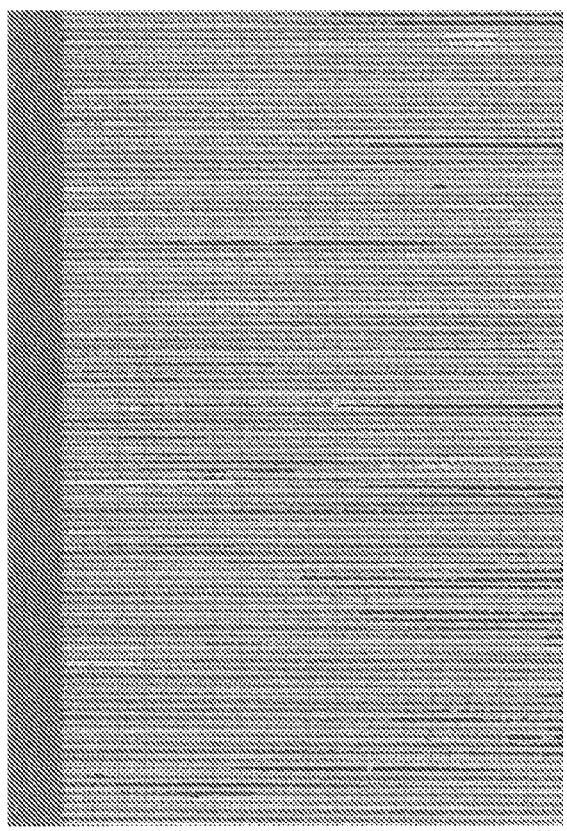
Figure 4C:
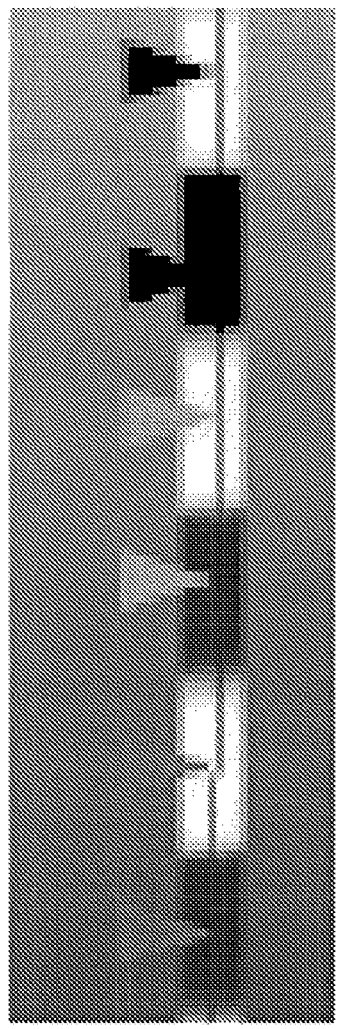
Figure 4D:
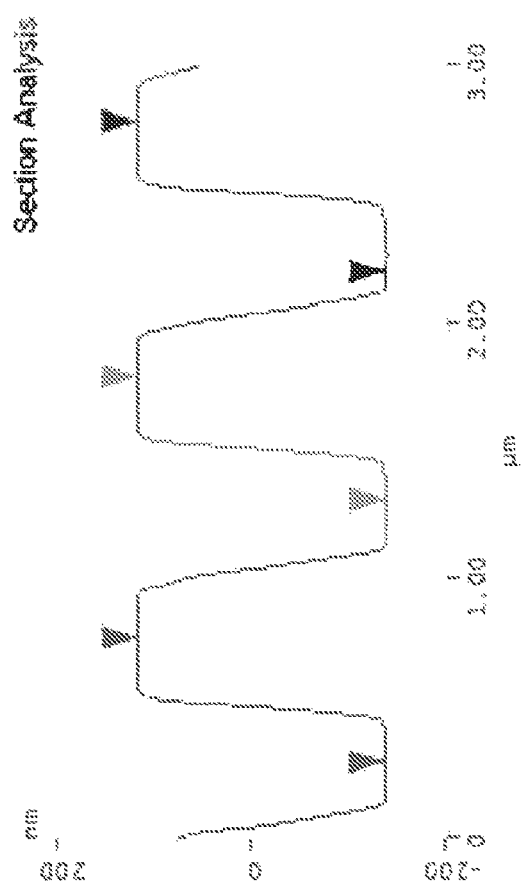
Figure 4F:
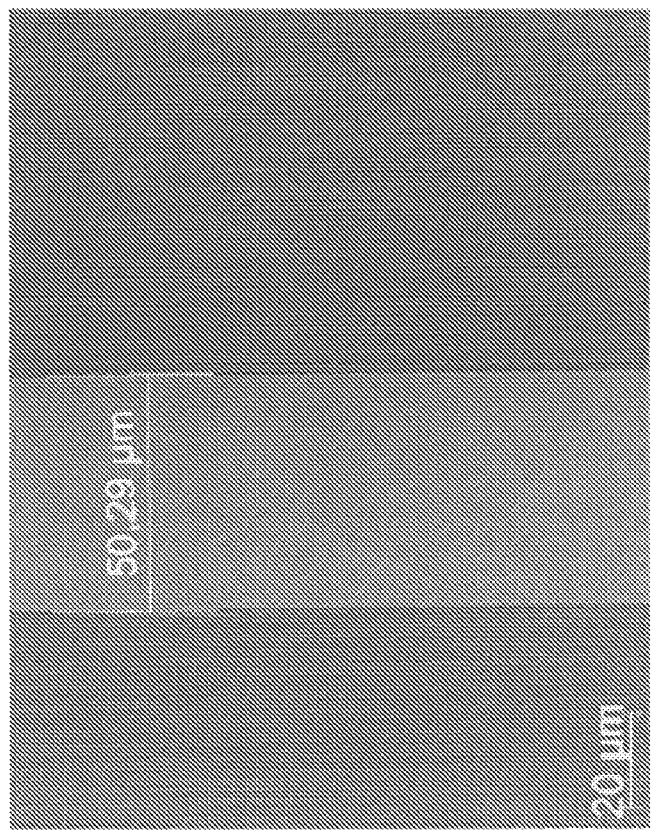
Figure 4E:
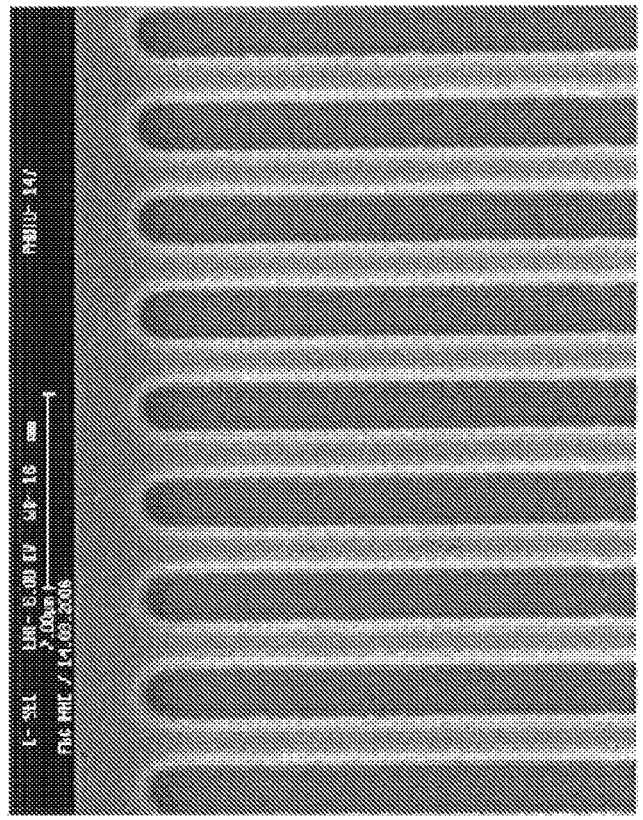

According to one embodiment, FIG. 3(*a*) shows an exemplary phase mask 102 having grooves with a depth "d" and a period "Λ." The grooves are formed in two sections A1 and A2, both having a period of 982.0 nm but different lengths. In one embodiment, the lengths may be the same. The length of section A1 may be 20 mm and the length of section A2 may be 15 mm. Other values are also possible. In one embodiment, a distance "a" between the sections A1 and A2 may be 0.05 mm, a width of the phase mask grating may be 2 mm, and the depth "d" of the grooves may be 172 nm. FIG. 3(*b*) shows the numerical values discussed above in a graphical form.

FIGS. 4(*a*) and (*b*) are SEM (scanning electron microscopy) pictures at different magnifications of a mask according to one embodiment of the present invention. FIG. 4(*c*) shows an AFM (atomic force microscopy) image of the same mask and FIG. 4(*d*) shows a dimensional measurement of the mask. FIGS. 4(*e*) and (*f*) shows high resolution SEM images of the same mask and indicate a gap of 50 µm between the two grating sections A1 and A2.

Figure 5:
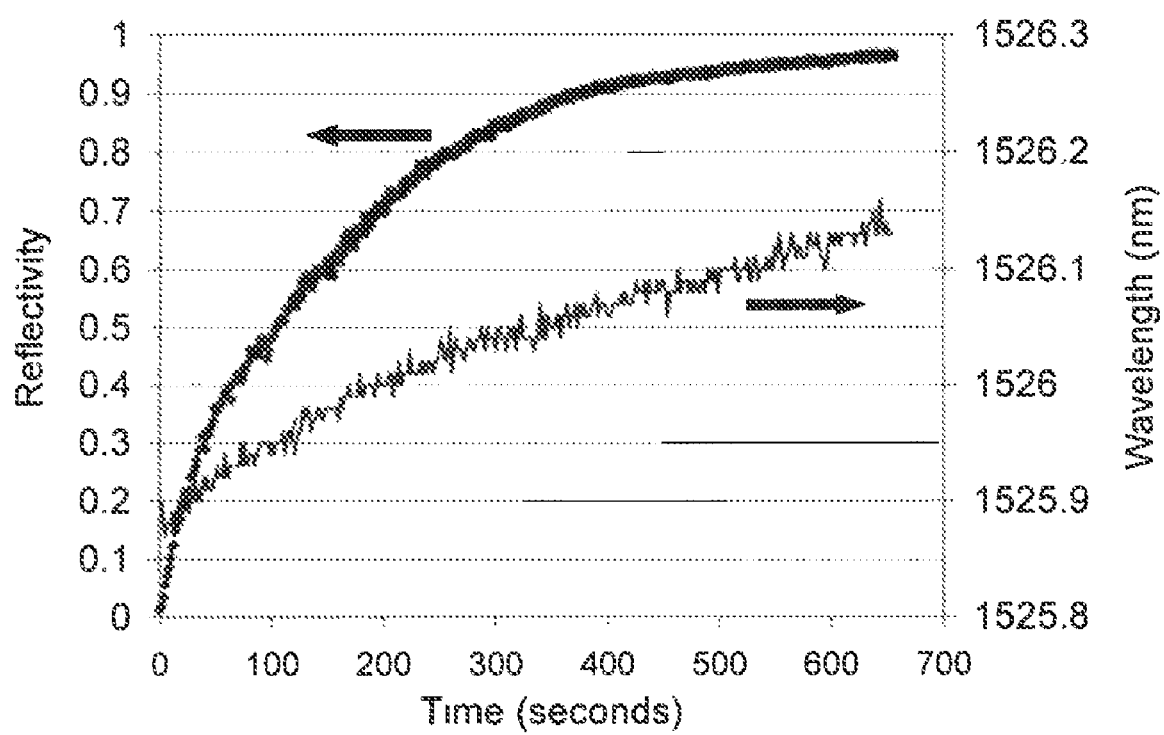
FIG. 5 is a graph showing a reflectivity versus time of the phosphate fiber Bragg grating according to one embodiment of the present invention.

FIG. 5 is a graph showing the growth of the grating reflectivity and central wavelength with increasing the UV dose during formation of the gratings in the fiber. The central wavelength ($\lambda_{Bragg}$) shift gives a direct measure of the modal effective index ($N_{eff}$) of the fiber since $\lambda_{Bragg}=2 N_{eff} \times \Lambda$, where Λ is the grating period in the fiber, a fixed parameter determined by the phase mask as discussed above. A shift in $\lambda_{Bragg}$ reveals the average change of the refractive index of the fiber induced by the irradiation. The gratings are formed by changing (modulating) the index of refraction of the grating at desired locations. In one embodiment, the gratings are formed in a first portion of the core and no gratings are formed in a second portion of the core of the same fiber. Moreover, in one embodiment, the fiber is a single mode fiber.

The reflectivity of the gratings is directly related to the refractive index modulation amplitude (Δn) of the gratings through the equation $R=\tanh^2(\pi \Delta n L \eta)$, where η is an overlap factor between the core mode and the cross section of the refractive index modulation. In addition, the transmission spectra shown in FIG. 5 indicate no coupling to cladding modes and hence a good overlap.

Figure 6:
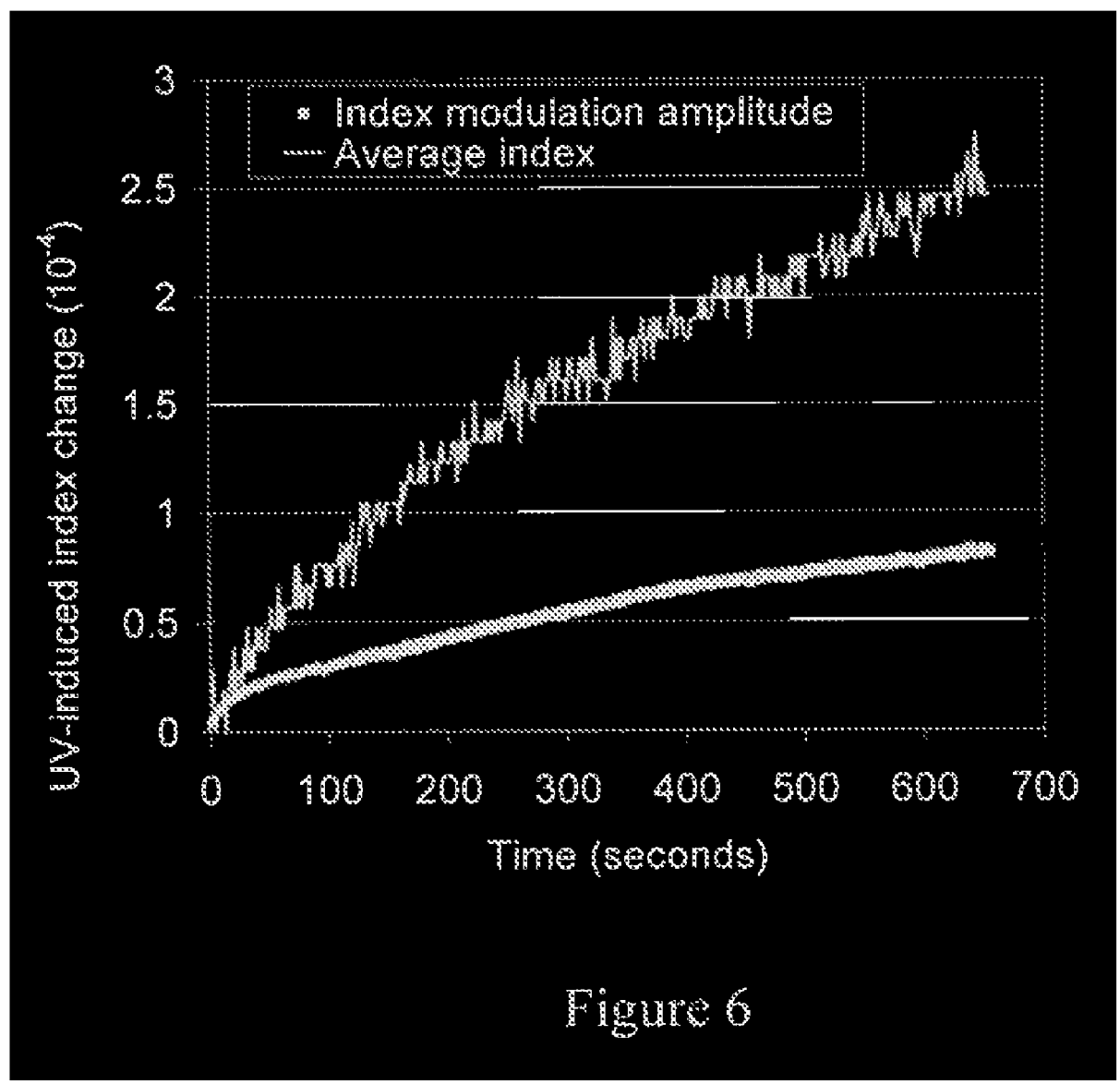
FIG. 6 is a graph showing UV-induced refractive index modulation amplitude and average value of the fiber according to one embodiment of the present invention.

Measurements of the UV-induced index change in the fiber are shown in FIG. 6. The results of FIG. 6 show that the average index change (the average of highest and lowest values of the index of refraction in the irradiated portion of the optical fiber) induced by the irradiation is positive and larger than the index modulation amplitude. In the case of a perfect grating with 100% fringe contrast and strictly positive index change, the modulation amplitude is equal to the average induced index change.

The formation of the refractive index modulation can be observed during illumination as shown in FIG. 6. The index modulation amplitude is defined as being one half of the difference between the highest and the lowest value of the index of refraction of the optical fiber in the region irradiated with UV light. It is noted that both the lowest and highest values of the index of refraction in the irradiated optical fiber is larger than the index of refraction of the optical fiber prior to UV irradiation.

Large refractive index modulations greater than $2 \times 10^{-5}$ and in one embodiment, greater than $10^{-4}$, are obtained after exposure to the UV light of the order of tens to thousands of seconds and heating between 0.5 and 10,000 hours.

Figure 7:
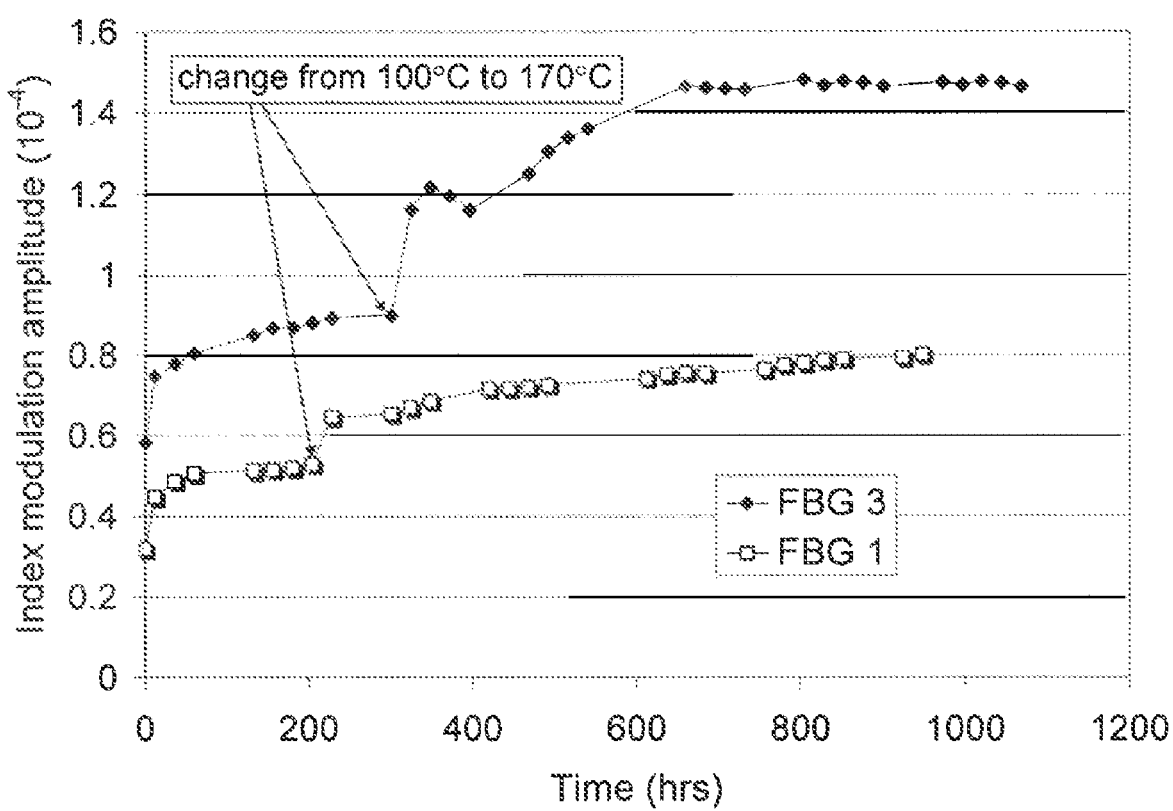
FIG. 7 is a graph that shows the gratings amplitude modulation growth during thermal treatment.

One concern in the conventional devices with photoinduced refractive index changes is the thermal stability of the changes. The induced changes in the fiber, according to one embodiment, were investigated by placing several samples in an oven maintained at 100° C. to monitor the development of the induced changes. In contrast to conventional gratings fabricated in silica fiber, the grating reflectivities increased instead of decaying, as shown by the growth in refractive index modulation plotted in FIG. 7 for two gratings with different initial reflectivities. A further increase in temperature to 170° C. led to even larger growth of the refractive index modulations. In the two cases shown in FIG. 7, the refractive index modulation amplitude more than doubled with an increase in temperature, a feature not exhibited by any of the known conventional devices. The first grating FBG 1 had an initial reflectivity of 52% at 100° C. and the second grating FBG 3 had an initial reflectivity of 87% at 170° C.

Then, a quick anneal at approximately 400° C. for about one minute was performed on the portion of the core having the gratings and it was observed a minimal thermal decay of the strongest grating as shown in FIG. 8(*a*). For this grating, lowering the reflectivity by 0.2% corresponds to a decrease of the refractive index modulation amplitude by 13%. The spectral quality of the gratings in transmission and reflection as shown in FIG. 8(*b*) is high and corresponds to shapes for gratings of uniform strength along their length. In particular, as noted above, the absence of features on the short wavelength side of the transmission spectrum indicates both very good alignment of the grating fringes perpendicular to the fiber axis, and very good uniformity of the fringe pattern across the depth of the fiber cross-section.

In another embodiment, similar results were obtained in fibers made from the same materials but using microstructured cladding for optical mode confinement and also in fibers with rare-earth dopants (Er and Yb) in the core to provide gain in the C-band. Thus, the fabrication of short, monolithic cavity phosphate glass fiber lasers with improved spectral purity and stability and lower fabrication costs can be achieved based on the above disclosed materials and methods.

For many applications such as fiber optic sensing, coherent optical communication, or as seed laser for laser ranging and LIDAR (Light Detection and Ranging) applications, high power (>10 mW and preferably greater than >25 mW), narrow linewidth (<10 kHz) single mode lasers that operate in the eyesafe spectral region of the telecommunication band around 1550 nm are in demand. These lasers include fiber, waveguide and microchip lasers.

Single-mode semiconductor diodes are limited to a maximum optical power of a few hundred mW by the occurrence of higher order transverse modes above leading above a certain level of injection currents. In contrast, multimode semiconductor laser diodes can generate several Watts of output power and can be combined to deliver hundreds of Watts of optical power through multimode fiber.

However, the deployment of fiber optic sensing require compact low-cost continuous single-mode lasers that can deliver greater than 50 mW of output power with a narrow linewidth. According with an embodiment of this invention, a novel optical device is provided that is capable of achieving this power as discussed next.

In one embodiment of the present invention, a distributed feedback Bragg fiber laser that is optically pumped by multimode diode lasers is discussed. The laser resonator is formed by a symmetric or asymmetric grating structure that provides distributed feedback for a signal light that is propagating in the single mode core of the active fiber. The grating structure is written directly into a doped single mode fiber by varying exposure to UV light, as discussed above with reference to FIGS. 2 and 6, and subsequently thermally treated, as discussed above with reference to FIGS. 7 and 8. This fabrication process results in a refractive index variation along the propagation direction inside the active fiber.

The core of the active fiber may be doped with various rare earth ions that absorb pump light at specific wavelengths and provide optical gain or signal amplification at other wavelength, specific for any particular rare earth ions. In one embodiment, the core of the phosphate glass is doped with erbium and ytterbium ions that provide absorption of pump light and optical gain. The spectral maximum of the optical gain is around the wavelength of 1535 nm and the distributed feedback grating structure has been designed to provide feedback for this wavelength, in one embodiment.

Figure 9:
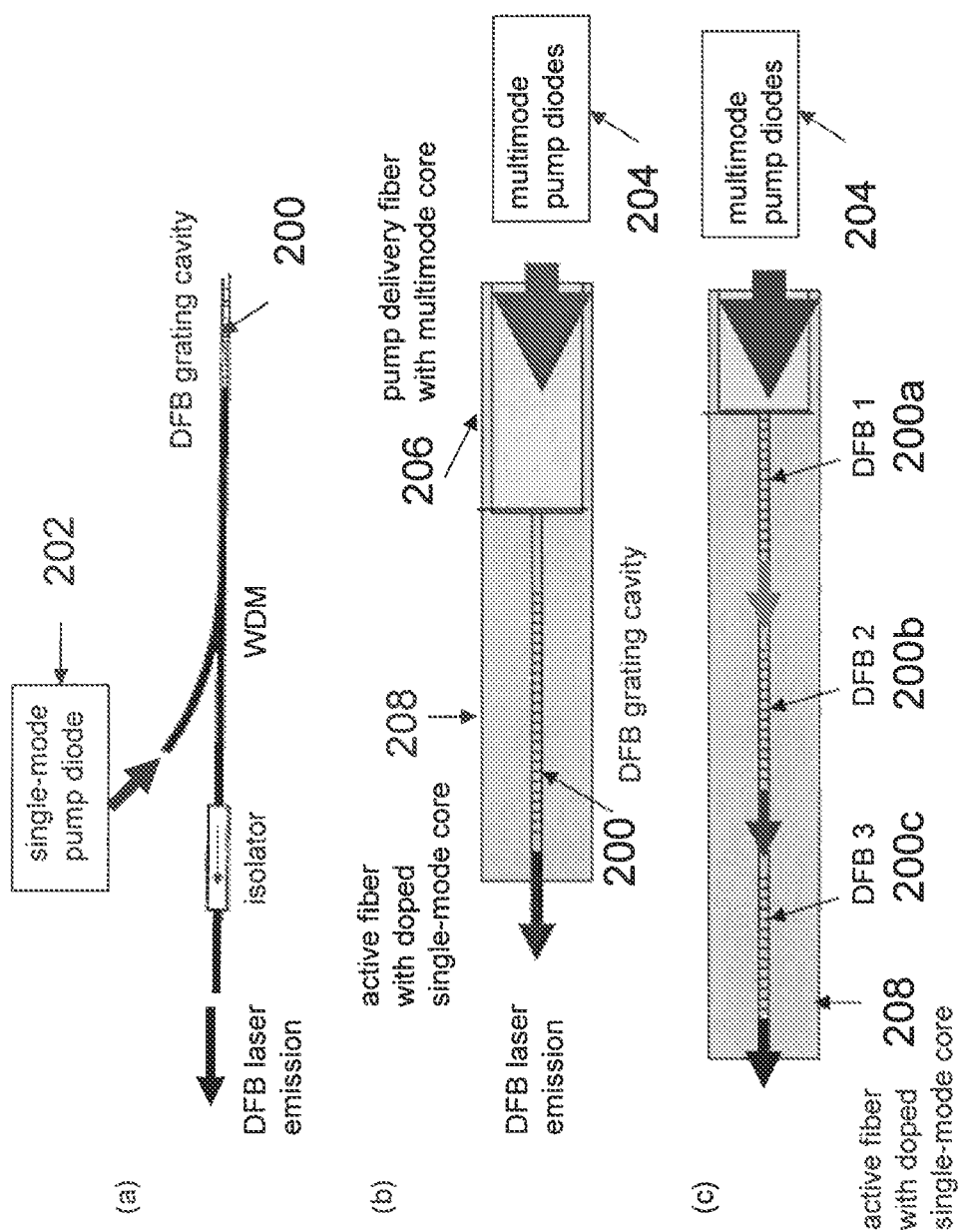
FIGS. 9(*a*) to (*c*) are schematic diagrams of a DFB laser pumped with a single-mode pump diode, multimode pump diodes and a multiple DFB laser implementation.

As shown in FIG. 9(a), in conventional DFB fiber lasers the DFB grating cavity 200 is pumped with a single-mode pump diode 202. However, the efficiency of the single-mode pumping process is low. According to one embodiment as shown in FIG. 9(b), the DFB grating cavity 200 is inside an active single mode phosphate fiber 208. Multimode pump light generated by multimode pump diodes 204 is delivered through a multimode optical fiber 206 that can be either spliced or mechanically coupled to the single mode fiber 208 that contains the DFB grating laser cavity 200.

In one embodiment, the DFB fiber laser cavity 200 may be formed in phosphate glass fiber with the method described in FIG. 2 using a phase mask as described in FIGS. 3 and 4. In one embodiment, all fibers are circular step index fibers. The active single mode phosphate fiber 208 has an outer diameter of 125 microns and a core diameter of 9 microns appropriate for single-mode guiding (usually less than 20 μm core diameter) and the multimode delivery fiber 208 has an outer diameter of 125 microns and a core diameter of 105 microns, to support a multimode optical signal as generated by the multimode pump diodes 204 (multimode pumping scheme).

In another embodiment, both the single mode fiber 208 and multimode fiber 206 are made of the similar or same phosphate glass and the two fibers are fusion spliced together.

In one embodiment, as shown in FIG. 9(c), multiple DFB grating cavities 200a, 200b, and 200c are formed in corresponding sections of the active phosphate single mode fiber 208. The number of gratings and corresponding portions can be between one and twenty. Each region may work as a laser. In another embodiment, some gratings in the single mode-fiber 208 may act as other known optical devices, for example as a wavelength filter.

Thus, according to the embodiments shown in FIGS. 9(b) and (c), one or more lasers and/or other optical devices can be formed in a monolithic single optical fiber without the need to splice together different optical components, thus improving the characteristics of the system. In other words, multiple optical components can be formed in a single given optical fiber and also, there is no mechanical connection (interface) between the various optical components and the optical fiber that guides the optical signal as all the optical components are formed in the single optical fiber.

Figure 10:
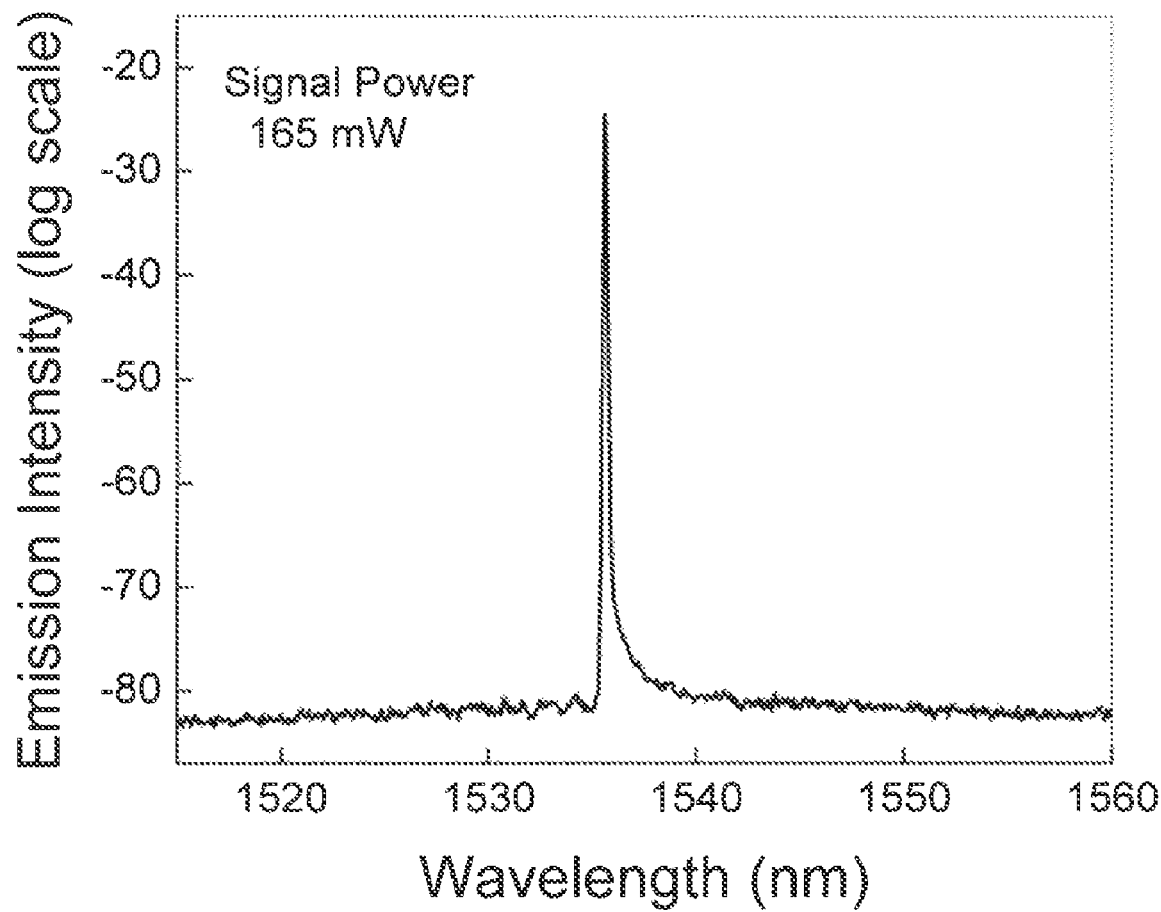
FIG. 10 is a graph showing the emission spectrum of the cladding pumped DFB fiber laser according to one embodiment of the present invention.

FIG. 10 shows the DFB fiber laser emission spectrum of the system 200 shown in FIG. 9(b) measured by an optical spectrum analyser. The cladding pumped DFB fiber laser (multi-mode pumping scheme) emits a narrow laser line located at the grating structure design wavelength. The width of the measured line in FIG. 10 is limited by the resolution of the spectrum analyzer (0.07 nm) and the true emission linewidth is narrower on the order of 10 to 100 kHz.

Figure 11:
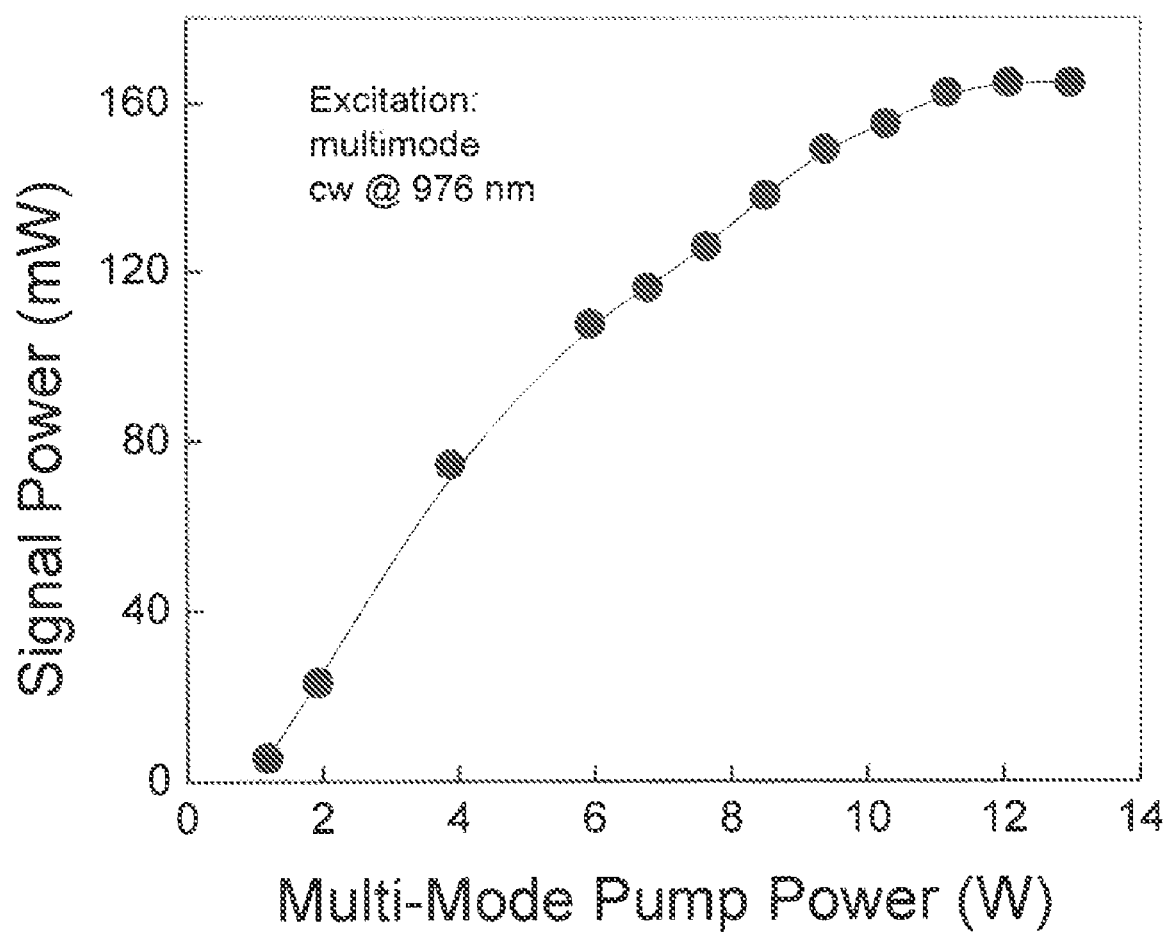
FIG. 11 is a graph showing an output power of the cladding pumped DFB fiber laser.

One advantage of the novel multimode pumping scheme is the availability of pump sources with much higher optical power at much lower cost compared to single mode laser diodes required for conventional core pumping of DFB fiber lasers. As shown in FIG. 11, a multimode pump light over ten Watts (hundreds of Watts are also possible) can be launch into the cladding of the active fiber shown in FIGS. 9(b) and (c) for example. The DFB fiber laser was found to operate stable up to ~160 mW of output power.

This power level is already amongst the highest reported output powers for any DFB fiber laser indicating the stability of the novel laser. The continuous performance over a ten hour period at an output power level of 150 mW was analyzed. The variations in output power and emission wavelength were below 2% and 0.05 nm, respectively during this ten hour period.

The novel multimode pumping scheme discussed above can be optimized for low price, high power, low amplitude and phase noise, stability of operation, wavelength tunability, or any combination of the above. It has a simple and robust structure and in the applied forward pumping geometry it does not require wavelength multiplexing structures (e.g. for pump and signal wavelength as shown in FIG. 9(a)) or optical isolators. Another advantage of this novel scheme is the easy implementation of a laser cascading scheme, as shown in FIG. 9(c).

A single high power multimode pump light source can be utilized to pump a cascade of DFB resonators that can be imprinted into the active fiber and can be designed to emit at desired wavelengths.

Figure 12:
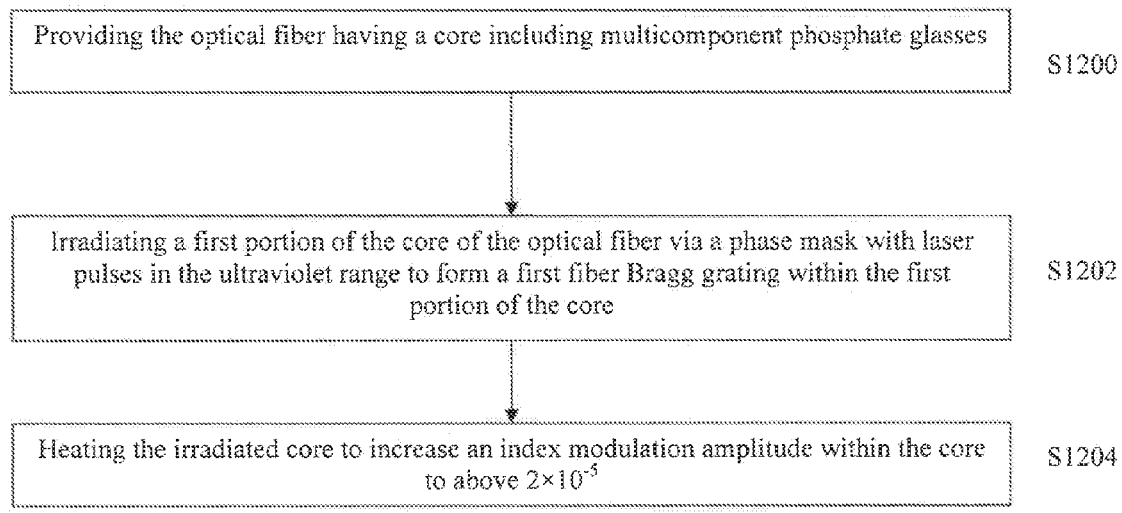
FIG. 12 is a flow chart illustrating a method for making a fiber Bragg grating in a phosphate glass fiber according to an embodiment of the present invention.

To summarize, a method of modulating an index of refraction in an optical fiber, as shown in FIG. 12, includes a step S1200 of providing the optical fiber having a core including multicomponent phosphate glasses, a step S1202 of irradiating a first portion of the core of the optical fiber via a phase mask with laser pulses in the ultraviolet range to form a first fiber Bragg grating within the first portion of the core, and a step S1204 of heating the irradiated core to increase an index modulation amplitude within the core to above $2 \times 10^{-5}$.

The method may also include irradiating the first region of the core with ultraviolet light between 10 and 700 seconds and heating the first region of the core between 0.5 to 10.000 hours, after the irradiating is performed. The method also may include irradiating a wave having a wavelength between 190 and 196 nm onto the mask, using a silica phase mask having a period of 976.3 nm, irradiating pulses having between 60 and 100 mJ at 80 to 120 Hz, each pulse having a time period between 10 and 18 ns, and irradiating the pulses over a portion of the core that has a length between 10 and 18 mm and a fluence per pulse between 360 and 440 mJ/cm$^2$. The method also may include heating the optical fiber at temperatures between 80 C and 400 C, forming a plurality of optical gratings within the core at predetermined distances, forming a fiber Bragg grating, doping the optical fiber with $10^{20}$ to $2 \times 10^{21}$ Yb ions/cm$^3$ and $10^{20}$ to $2 \times 10^{21}$ Er ions/cm$^3$, and combining $P_2O_5$ with at least one of BaO, $Al_2O_3$, and $B_2O_3$ to produce the optical fiber.

Figure 13:
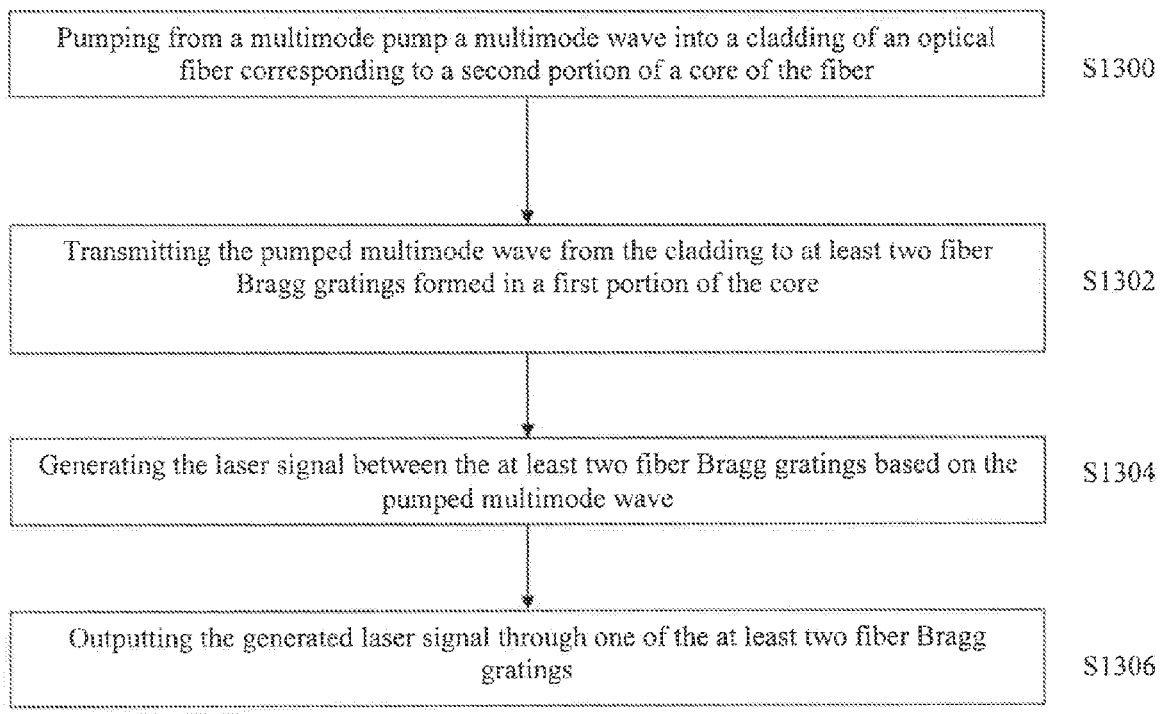
FIG. 13 is a flow chart illustrating a method of using the fiber Bragg grating in the phosphate glass fiber according to an embodiment of the present invention.

A method for generating a laser signal in a laser device including an optical fiber having a core that includes multicomponent phosphate glasses, the core having first and second portions surrounded by a cladding, and at least two fiber Bragg gratings in which an index modulation amplitude is greater than $2\times10^{-5}$, the at least two fiber Bragg gratings disposed in the first portion of the core at a predefined distance from each other, is shown in FIG. 13. The method includes a step S1300 of pumping from a multimode pump a multimode wave into the cladding corresponding to the second portion of the core, a step S1302 of transmitting the pumped multimode wave from the cladding to the at least two fiber Bragg gratings, a step S1304 of generating the laser signal between the at least two fiber Bragg gratings based on the pumped multimode wave, and a step S1306 of outputting the generated laser signal through one of the at least two fiber Bragg gratings.

The method may also include outputting the generated laser signal into a second portion of the core, the third portion being spliceless with the first portion, and generating multiple laser signals by multiple pairs of fiber Bragg gratings formed in the first portion of the core.

Numerous modifications and variations of the present invention are possible in light of the above teachings. It is therefore to be understood that within the scope of the appended claims, the invention may be practiced otherwise than as specifically described herein.

What is claimed is:

1. An optical device comprising:
an optical fiber having an active core and a cladding surrounding the core, said active core configured for optical gain and said active core including multicomponent phosphate glasses; and
a first fiber Bragg grating formed in a first portion of the multicomponent phosphate glass active core of the optical fiber and having an index modulation amplitude greater than $2\times10^{-5}$.

2. The optical device of claim 1, wherein a thickness of the first portion of the core is less than 10 μm.

3. The optical device of claim 1, further comprising:
a second fiber Bragg grating formed in the first portion of the optical fiber, the second fiber Bragg grating forming a laser with the first fiber Bragg grating such that an electromagnetic wave generated in the laser is amplified between the first and second fiber Bragg gratings, wherein the laser is configured to output a first amplified wave into a second portion of the core of the optical fiber that is connected to the first portion.

4. The optical device of claim 3, further comprising:
an optical pump configured to pump light into the first portion of the core to excite doping ions to generate the first amplified wave.

5. The optical device of claim 3, wherein a distance between the first fiber Bragg grating and the second fiber Bragg grating is between 0.5 cm and 50 cm.

6. The optical device of claim 3, further comprising:
third and fourth fiber Bragg gratings formed in the second portion of the core and configured to output a second amplified wave in a third portion of the core,
wherein the third portion is continuous with the second portion and both the second and third portions of the core include the multicomponent phosphate glasses.

7. The optical device of claim 3, further comprising:
an enlarged portion of the core having a thickness larger than the thickness of the first and second portions of the core and including the multicomponent phosphate glass such that the enlarged portion of the core is configured to propagate a wave with multiple modes and the first and second portions are configured to propagate only a single mode wave.

8. The optical device of claim 1, wherein the multicomponent phosphate glasses include at least one of $BaO$, $Al_2O_3$, and $B_2O_3$.

9. The optical device of claim 3, wherein the optical fiber including the first and second portions is a monolithic all-fiber device.

10. The optical device of claim 4, wherein the pump is configured to launch the pump light into the cladding of the optical fiber.

11. The optical device of claim 1, wherein the optical fiber comprises a single-mode phosphate fiber.

12. The optical device of claim 11, wherein the single-mode phosphate fiber comprises an outer diameter and a core diameter dimensioned for single mode operation.

13. The optical device of claim 12, wherein the outer diameter is for single mode guiding and is sized to be compatible with telecommunication fiber pigtails.

* * * * *